(12) United States Patent
Kärkkäinen et al.

(10) Patent No.: US 6,600,936 B1
(45) Date of Patent: Jul. 29, 2003

(54) TERMINAL FOR WIRELESS TELECOMMUNICATION AND METHOD FOR DISPLAYING ICONS ON A DISPLAY OF SUCH A TERMINAL

(75) Inventors: Kari Kärkkäinen, München (DE); Amin Torabi, München (DE); Philip Vann, München (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/501,103

(22) Filed: Feb. 9, 2000

(30) Foreign Application Priority Data

Feb. 11, 1999 (EP) .............................. 99102617

(51) Int. Cl.⁷ ................................. H04B 1/38
(52) U.S. Cl. ..................... 455/566; 455/90; 455/575; 455/550; 345/649; 345/650; 345/671
(58) Field of Search ................. 455/566, 90, 575, 455/550, 73; 345/808, 835, 775, 810, 840, 649, 650, 684, 671; 379/419

(56) References Cited

U.S. PATENT DOCUMENTS

| | | | | |
|---|---|---|---|---|
| 5,565,888 A | * | 10/1996 | Selker | 345/823 |
| 5,742,779 A | | 4/1998 | Steele et al. | |
| 5,915,228 A | * | 6/1999 | Kunihiro et al. | 455/575 |
| 5,977,975 A | * | 11/1999 | Mugura et al. | 345/822 |
| 6,047,197 A | * | 4/2000 | Jarrad | 455/566 |
| 6,073,036 A | * | 6/2000 | Heikkinen et al. | 455/575 |
| 6,208,342 B1 | * | 3/2001 | Mugura et al. | 345/810 |
| 6,384,827 B1 | * | 5/2002 | Dawkins | 345/467 |

FOREIGN PATENT DOCUMENTS

| | | | |
|---|---|---|---|
| EP | 0 727 730 | 8/1996 | |
| EP | 0 792 056 | 8/1997 | |
| WO | WO 98 30004 | 7/1998 | |
| WO | WO 98/30004 | * 7/1998 | H04M/1/00 |

* cited by examiner

*Primary Examiner*—Nay Maung
*Assistant Examiner*—Sonny Trinh
(74) *Attorney, Agent, or Firm*—Frommer Lawrence & Haug LLP; William S. Frommer

(57) ABSTRACT

A terminal (1) for wireless telecommunication and to a method for displaying icons on a display (2) of the terminal (1) for wireless telecommunication includes a display (2) for displaying icons corresponding to menu items and other information, a scroll (6), for example a jog dial, for scrolling through icons and highlighting a respective selected icon, and an enter (5) for entering a respective highlighted icon to chose the corresponding menu item. At least some of all available icons of the menu are displayed on the display (2) at the same time and the scroll (6) can be actuated to scroll through the icons in at least two directions so that the respective selected icon is highlighted depending on the actuation of the scroll (6).

16 Claims, 3 Drawing Sheets

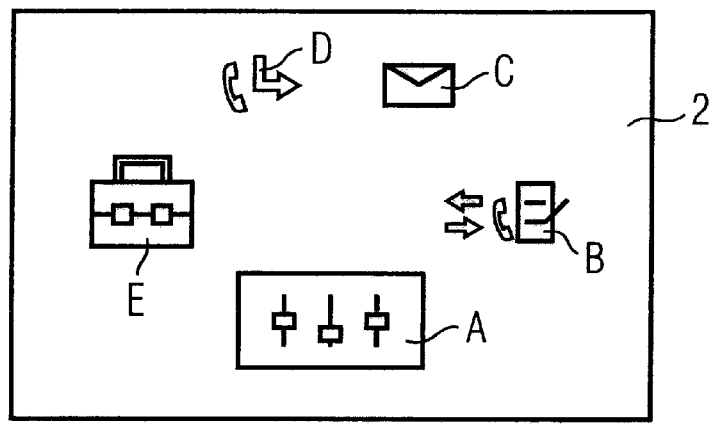
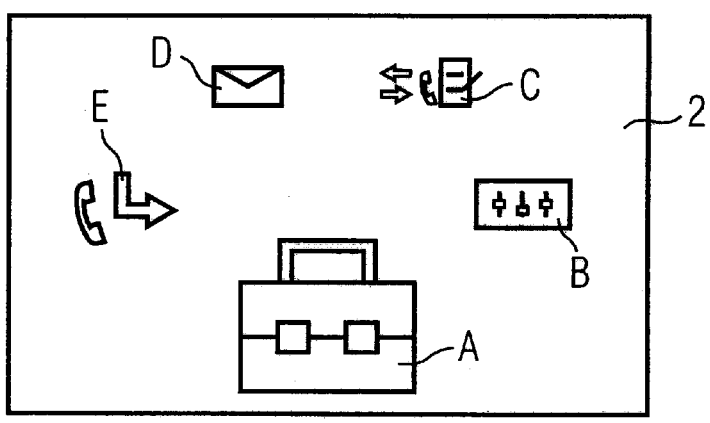
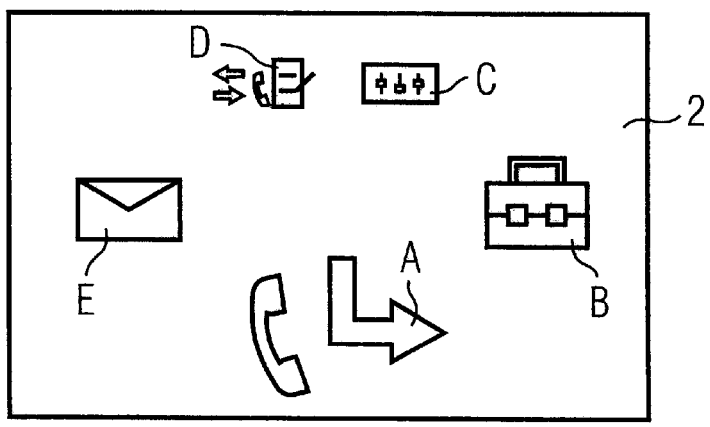

TERMINAL FOR WIRELESS TELECOMMUNICATION AND METHOD FOR DISPLAYING ICONS ON A DISPLAY OF SUCH A TERMINAL

The present invention relates to a terminal for wireless telecommunication and a method for displaying icons on a display means of such a terminal.

BACKGROUND OF THE INVENTION

Terminals for wireless telecommunication are for example base stations or mobile stations of a telecommunication system. The mobile stations can be a portable telephone or some other portable electronic device comprising the possibility of sending and receiving information in a wireless telecommunication system.

The present invention relates particularly to terminals for wireless telecommunication, which comprise display means for displaying icons corresponding to menu items and other information. Icons are symbols or pictures used to visualize selectable menu items. If a menu has for example three submenues or three subfunctions to select, these submenues or subfunctions could be visualized by three different icons. Usually, the icons replace the corresponding text display of a term or an expression describing the respective menu item, so that the icons can be used independently from the chosen user language.

Many different portable telephones having displays for displaying icons are presently on the market. A portable telephone sold by Alcatel and named "One touch pocket" for example has a display means for displaying icons corresponding to menu items, scroll means for scrolling through icons and several enter means for entering a respective icon to choose the corresponding menu item. The scroll means is a key having arrows which indicate the two directions in which the icons can be scrolled through. The display thereby shows three icons adjacent to each other on a horizontal line. Scrolling upwardly and downwardly, the display shows the three respective succeeding icons. Under the display, three enter keys are located, which are respectively allocated to one of the shown three icons. In other word, the menu item corresponding to one of the displayed icons can be selected and entered by pressing the respective key allocated to the respective icon.

A portable telephone sold by SONY under the name "Z1 Plus" comprises a display means for displaying icons corresponding to menu items and other information, a scroll means for scrolling through icons and highlighting a respective selected icon, and an enter means for entering a respective highlighted icon to choose the corresponding menu icon, whereby at least some of all available icons of a menu are displayed on the display at the same time and whereby the scroll means can be actuated to scroll through the icons in two directions so that the respective selected icon is highlighted depending on the actuation of the scroll means. The scroll means is a rotational key (jog dial), which can be turned clockwise or counterclockwise to scroll through the displayed icons and to select one of them. In each menu, three icons are displayed at the same time adjacent to each other on a horizontal line on the display. The selected one of the three displayed icons is highlighted by means of an inverted or negative display of the respective icon. The respective menu item of the highlighted icon can be entered by pressing an enter key. Only a single enter key needs to be provided. By turning the rotational key the three displayed icons are successively highlighted in the respective direction. In case that one of the icons on the left or the right side of display is highlighted and the rotational key is turned in the direction corresponding to the next successive icon, which is not displayed, the next succeeding three icons are displayed on the display. In other words, the icons are displayed blockwise on the display. By scrolling successively through the icons of the menu, the display shows the respective groups of three icons in succession, whereby the three displayed icons are highlighted and thus selected one after the other so that, when a new group of three icons is shown, the next successive highlighted icon is the one located on the opposite side of the preceding highlighted icon.

Although the last solution has the advantage that only one enter key is necessary compared to three as in the above-described Alcatel portable phone, it is not obvious in which direction the icons are going to be highlighted and the blockwise movement of the icons will take place, particularly when a rotational key (jog dial) is used. Especially since the displays on portable devices are usually small, usually not all available icons of a menu can be displayed on the display at the same time. Thus it is not obvious for a user, what the remaining non-displayed icons of the menu are and how to reach them. Further, the inversion of the icons is sometimes not a clear indication for a user, that this is the icon that can be selected, since the inversion of an icon often leads to a confusing or perturbing image.

SUMMARY OF THE INVENTION

The object of the present invention is therefore to provide a terminal for wireless telecommunication and a method for displaying icons on a display means of a terminal for wireless telecommunication, which provide for a clear and unambiguous way of highlighting a selected icon and allow at the same time a large number of icons of a menu to be displayed on the display means at the same time.

This object is achieved by a terminal for wireless telecommunication according to claim 1, which is characterized in that the respective selected icon is displayed enlarged in relation to the other displayed icons, whereby the icons are displayed enlarged in their successive order in one of the at least two directions depending on the actuation of the scroll means.

The above object is further achieved by a method for displaying icons on a display of a terminal for wireless telecommunication, which is characterized in that the respective selected icon is displayed enlarged in relation to the other displayed icons, whereby the icons are displayed enlarged in their successive order in one of the at least two directions depending on the actuation of the scroll means.

According to the present invention, the respective selected icon is displayed enlarged, which means that the other displayed icons are displayed with a smaller size, so that more icons than in known devices can be displayed on the display at the same time. Further, the respective selected icon can thus be displayed in more detail, so that the user gets a clear and unambiguous information on the corresponding selected menu item. Since the not selected icons are displayed smaller, more and in most cases all available icons of a menu can be displayed on the display, so that the user always has an overlook over all possible options. By displaying the icons enlarged in their successive order in one of the at least two directions depending of the actuation of the scroll means, a clear and unambiguous allocation of the actuation direction of the scroll means and the order of the successive enlarged display of the selected icons can be assured.

Advantageously, the icons are displayed in a circular arrangement. The circular arrangement allows a clearly visible allocation of the actuation direction of the scroll means to the successive enlargement of the selected icons. This is particularly true when the scroll means is a rotatable key Cog dial). Also, the icons could be arranged in a matrix and scrolled through line by line.

Further advantageously, by actuating the scroll means, the displayed icons successively change their position so that the enlarged display of a selected icon is always located at the same position on the display means. This means, by actuating the scroll means, the displayed icons move through the predetermined positions, whereby always the icon on a particular predetermined position is enlarged. Thereby, the user does not need to look around the display to find the enlarged icon, but can always be sure to find the enlarged and thus selected icon on the same position of the display. Advantageously, the position of the enlarged display icon is thereby located on a central position of the area of the display, in which the icons are displayed. The central area of the display is always the first area, onto which a user looks, so that the selected icon can be found even more quickly. Alternatively, the icons could maintain their position and be enlarged one after the other by actuation of the scroll means.

It is further advantageous, when the preceding and the succeeding icon to the actually selected icon are displayed enlarged in relation to the other displayed icons but smaller than the actually selectable icon. This means, that the two icons adjacent to the enlarged icon have a size between the enlarged icon and the other displayed icons. Hereby the user gets a more detailed and clearer information about the next icon which is selectable. Particularly in connection with the circular arrangement of the icons, a three-dimensional effect can be achieved, when the enlarged icon is shown on the bottom, the small icons are shown on the top and the middle sized icons are shown on the left and on the right side of the display. Thus, the small icons on the top appear to be far away, the enlarged icon on the bottom appears to be the nearest and the mid-size icons on the left and on the right side appear to be located in a semi-distance. Particularly in case that the display is a graphical display with a high resolution, a very smooth and visually appealing rotation motion of the icons can be realised.

Advantageously, the scroll means is a jog dial which can be rotated to scroll through the icons. A jog dial is a rotatable key, which is easy to handle and which provides a clear and unambiguous allocation of the actuation direction of the jog dial to the moving direction of the icons on the display. Particularly in case of the circular arrangement of the icons, a clockwise rotation of the jog dial advantageously results in a clockwise movement of the icons, and a counterclockwise rotation of the jog dial results in a counterclockwise movement of the icons, so that the user knows exactly, in which direction to turn the jog dial to arrive at the icon he wishes to choose.

Further advantageously, a text display of the menu item of the respective selected icon on the display is shown close to the position of the selected icon. Hereby, additional information is provided for a user, in case he/she does not know the meaning of the icons very well and to enable a quicker understanding of the selected menu items.

The present invention is particularly advantageous for small terminals, for example portable telephones, which have small displays.

It is to be understood that also more than one icon can be selected and highlighted at the same time, whereby one enter key for each highlighted icon is advantageously provided. For example, three icons can be highlighted at the same time and three corresponding enter keys can be provided, which can be pressed to enter the corresponding menu item.

According to a further aspect of the present invention, a terminal for wireless telecommunication is provided, with a display means for displaying icons corresponding to menu items and other information, a scroll means for scrolling through icons and highlighting the respective selected icon, and an enter means for entering a respective highlighted icon to choose the corresponding menu item, whereby at least some of all available icons of a menu are displayed on the display at the same time and whereby the scroll means can be actuated to scroll through the icons in at least two directions so that the respective selected icon is highlighted depending on the actuation of the scroll means, characterized in that by actuating the scroll means the displayed icons successively change their position so that the enlarged display of a selected icon is always located at the same position on the display. This aspect of the present invention further comprises a corresponding method for displaying icons on a display of such a terminal for wireless telecommunication.

This further aspect of the present invention has an advantage in that the respective selected and highlighted icon is always located on the same position of the display, so that the user does not need to look for the highlighted icon on the display. Advantageously, the position of the highlighted icon is located on a central position of the area of the display in which the icons are displayed. This is particularly advantageous, since the users tend to look always to the center of a display first. Further advantageously, the icons are displayed in a circular arrangement. Thereby, the user can gain a quick and cleaner overlook over the icons available in a menu. Further, the scroll means can be a jog dial, which can be rotated to scroll through the icons. Particularly in connection with the circular arrangement of the icons, a clear and unambiguous allocation of the rotation direction of the jog dial to the rotation direction of the icons is ensured. Further, a text display of the menu item of the respective selected icon on the display closed to the position of the selected icon can be provided.

BRIEF DESCRIPTION OF THE DRAWINGS

In the following description, the present invention is explained in more detail by means of a preferred embodiment relating to the enclosed drawings, in which FIG. 2 shows an enlarged view of the display of the portable telephone shown in FIG. 1 with a first example of displayed icons, FIG. 3 shows an enlarged view of the display of the portable telephone shown in FIG. 1 with a second example of displayed icons, FIG. 4 shows an enlarged view of the display of the portable telephone shown in FIG. 1 with a third example of displayed icons.

DETAILED DESCRIPTION OF A PREFERRED EMBODIMENT

Figure 1:
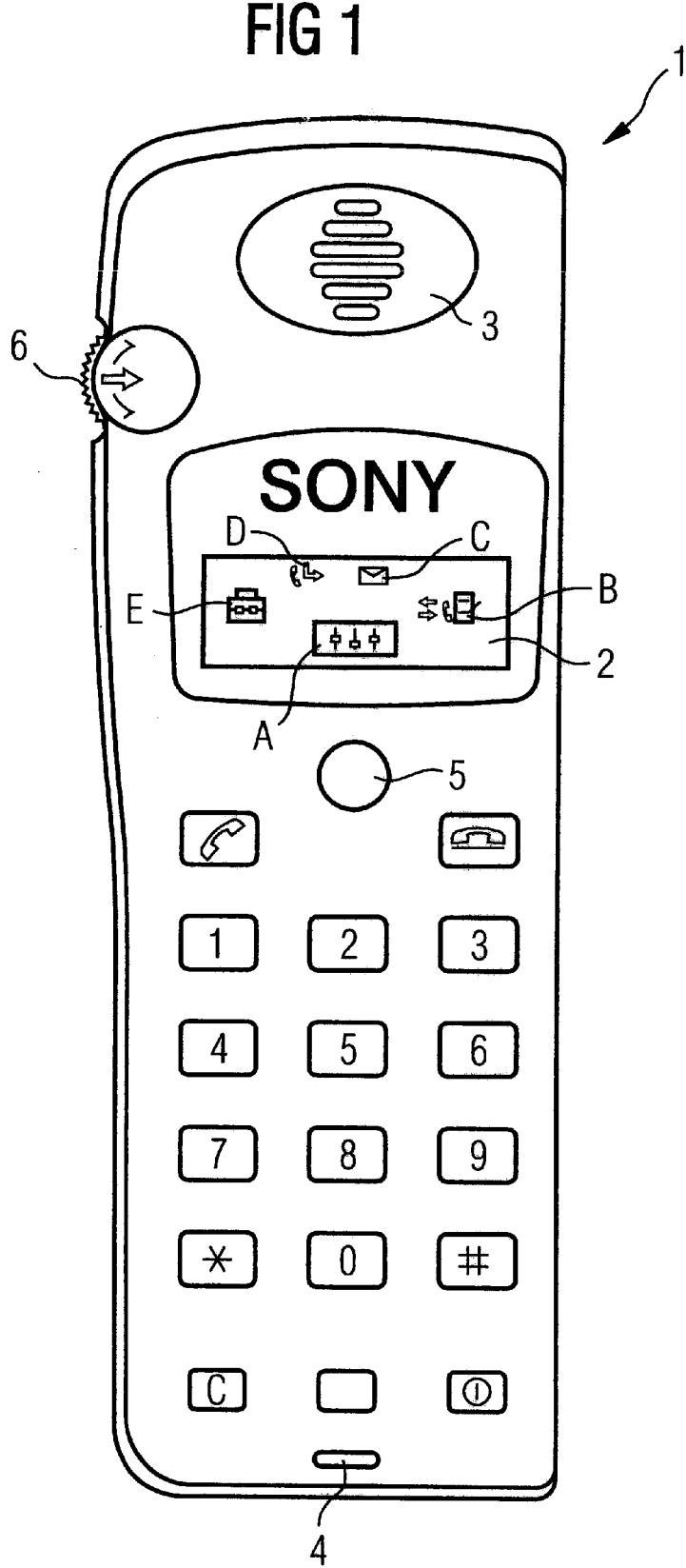
FIG. 1 shows a schematic top view of an embodiment of a terminal for wireless telecommunication according to the present invention, namely a portable telephone.

FIG. 1 shows a schematic top view of a portable telephone 1 for wireless telecommunication according to the present invention. The portable telephone 1 comprises a display 2, on which icons corresponding to menu items and other information, such as text information, can be displayed. The portable telephone 1 further comprises a loudspeaker 3 on the upper front part and a microphone 4 on the lower front part of the casing. Further, an enter key 5 as enter means for entering a respective menu item or function is provided. The portable telephone 1 further comprises the usual number keys, the pound key, the power on/off key and so on. The jog dial 6 is provided on an upper sidepart of the portable telephone 1. The jog dial 6 is a rotatable key, a part of which is exposed to the outside. The exposed part can be touched by the finger of a users hand and can be rotated clockwise (upwardly) or counterclockwise (downwardly) to scroll through menu items or functions displayed on the display 2.

The menu items or functions can be displayed as text display or as icons on the display 2. The text display is for example a term or an expression written in characters and explaining the meaning of the respective function or menu item. An icon is a graphical display of a symbol, which stands for the respective menu item or for the respective other function, of the respective device.

Preferably, the display 2 of the portable telephone 1 is a graphical display, which has a much higher resolution than usual text or character displays, and allows a visually attractive display of a smooth rotation movement of the icons.

The display 2 of the portable telephone 1 illustrated in FIG. 1 shows five icons on five different positions A, B, C, D and E. Each displayed icon corresponds to the menu item of a menu. Since each icon visualizes the respective meaning of the menu item, the icons can be used independent of the selected user language of the telephone.

The icon on position A is enlarged compared to the other displayed icons. This means, that the icon on position A is selected and highlighted so that the respective menu item can be entered by pressing the enter key 5. All five shown icons are arranged in a circular arrangement on the display 2, whereby a three-dimensional effect is achieved by positioning the enlarged icon on position A which is the position on the bottom center of the display 2. The two icons located on positions C and D are the smallest icons displayed. Positions C and D are located on the top of the display 2. The icons located on positions B and E have a middle size between the small size of the icons at positions C and D and the enlarged size of the icon on position A. Positions B and E are approximately on a middle horizontal line of the display 2 on the right and left hand side of the display 2. Since the icon on position A is the biggest displayed icon, it appears to be "in front", whereby the icons on positions C and D appear to be "in back" of the display.

In FIG. 2, the display 2 is shown in an enlarged view. The icons of the display in FIG. 2 are arranged in the same manner as in FIG. 1. The icon on position A corresponds to the menu item "control", the icon on position B corresponds to the menu item "redial list", the icon on position C corresponds to the menu item "messaging", the icon on position D corresponds to the menu item "divert" and the icon on position E corresponds to the menu item "preferences". Since the icon "control" is shown enlarged on position A, the menu item "control" is selected and can be entered by pressing the enter key 5 of the portable telephone 1.

FIG. 3 shows a second example of the arrangement of the five icons shown in FIG. 2. In the display 2 shown in FIG. 3, the icon of the menu item "preferences" is shown enlarged on position A. Thus, by pressing the enter key 5 of the portable telephone 1, the menu item "preferences" can be entered. Comparing the display 2 of FIG. 2 and the display 2 of FIG. 3, it can be noted, that the icons are still arranged in the same successive circular order, but changed their places by one position. Starting from the arrangement of the icons shown in FIG. 2, the circle of icon is turned in the counterclockwise direction by one position to arrive at the arrangement shown in FIG. 3. This changement of the icon position by one in the counterclockwise direction is achieved by turning the jog dial 6 of the portable telephone 1 shown in FIG. 1 downwardly in the counterclockwise direction. Thus, the moving direction of the jog dial 6 results in a movement of the circularly arranged icons on the display 2 in the same direction. In case that a user starts from the arrangement of the icons shown in FIG. 3 and wishes to position the icon "control" on position A, where it is enlarged and the corresponding menu item can be entered, he has to turn the jog dial 6 of the portable telephone 1 shown in FIG. 1 in the clockwise direction, so that the icons also change their position by one in the clockwise direction.

If the user starts from the arrangement of the icons shown in FIG. 3 and turns the jog dial 6 once in the counterclockwise direction, the icons change their position by one in the counterclockwise direction, so that an arrangement as shown in FIG. 4 is achieved. In this arrangement, the icon for the menu item "divert" is displayed enlarged at position A and can be entered by pressing the enter key 5. If the user now wants to get from the arrangement shown in FIG. 4 to the arrangement shown in FIG. 2, he has to turn the jog dial 6 two times upwardly in the clockwise direction, so that the icons change their position twice clockwise.

The icon for the menu item "divert" is shown in three different sizes on the display 2 of FIG. 2, FIG. 3 and FIG. 4, respectively. In FIG. 2, the icon "divert" is shown on position D on the display 2, in FIG. 3, the icon "divert" is shown on position E on the display 2, and in FIG. 4, the icon "divert" is shown on position A of the display 2. On position D, the icon has a small size, on position E, the icon has a mid-size and on position A, the icon has the enlarged or biggest size. Comparing the FIGS. 2, 3 and 4, it can be seen, that on positions E and B, the icons show more details than on positions C and D, and the icons on position A consequently show more details than on positions B and E. Thus, the readability of a selected icon positioned on position A is much better than for the other icons. Further, since the respective successive or preceding icons on positions B and E are already displayed bigger than the icons shown on positions C and D, a user has a more detailed information on the next icons to be chosen.

Figure 5:
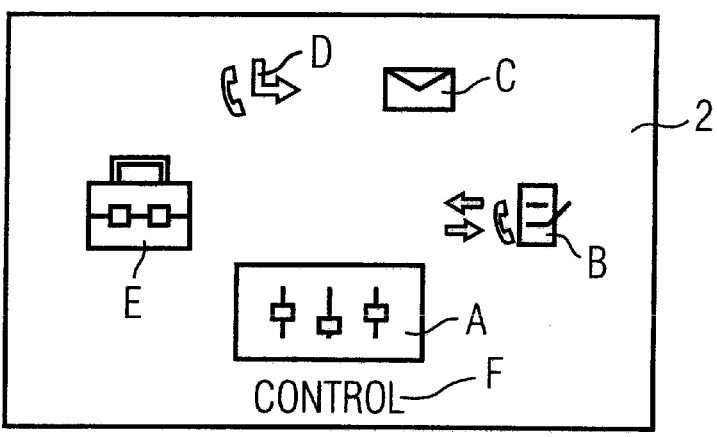
FIG. 5 shows the display shown in FIG. 2, whereby a text display of the enlarged menu icon is added.
Figure 6:
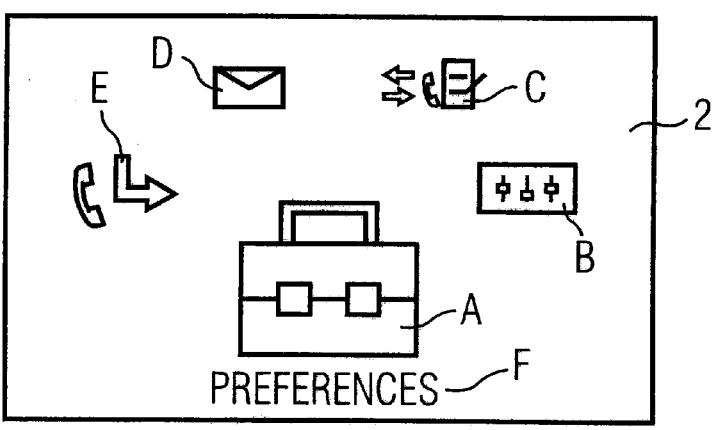
FIG. 6 shows the display of FIG. 3, whereby a text display of the menu item of the enlarged icon is added.
Figure 7:
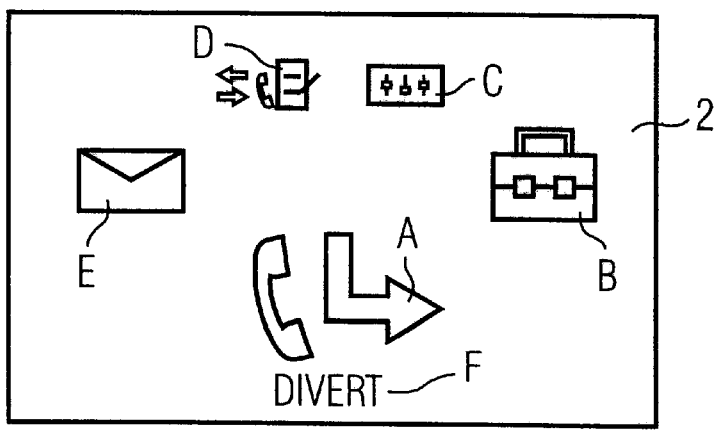
FIG. 7 shows the display of FIG. 4, whereby a text display of the menu item of the enlarged icon is added.

In FIG. 5, 6 and 7 the schematic views of the displays 2 shown in FIG. 2, 3 and 4, respectively, are again shown, whereby a respective text information on the enlarged icon on position A is added on a position F. Position F is located under position A on the display 2, so that a direct allocation of the icon with the text information on the respective menu item is ensured. The display 2 shown in FIG. 5 displays the word "control" on position F, which corresponds to the menu item of the icon displayed on position A. On the display 2 shown in FIG. 6, the word "preferences" is shown on position F, which corresponds to the menu item of the icon displayed on position A. On the display 2 shown in FIG. 7, the word "divert" corresponding to the menu item of the icon shown in position A is displayed on position F.

What is claimed is:

1. Terminal (1) for wireless telecommunication, with
a display means (2) for displaying icons (A, B, C, D, E) corresponding to menu items and other information,
a scroll means (6) for scrolling through icons (A, B, C, D, E) and highlighting a respective selected icon (A), and
an enter means (5) for entering, a respective highlighted icon (A) to choose the corresponding menu item,
whereby at least some of all available icons (A, B, C, D, E) of a menu are displayed on the display means (2) at the same time in a circular arrangement and
whereby the scroll means (6) can be actuated to scroll through the icons (A, B, C, D, E) in clockwise and counter clockwise directions so that the respective selected icon (A) is highlighted depending on the actuation of the scroll means (6),
characterized in,
that the respective selected icon (A) is displayed enlarged in relation to the other displayed icons (B, C, D, E), whereby the icons are displayed enlarged in their successive order in one of the at least two directions depending on the actuation of the scroll means (6).

2. Terminal (1) for wireless telecommunication according to claim 1, characterized in,
that the icons (A, B, C, D, E) are displayed in a circular arrangement.

3. Terminal (1) for wireless telecommunication according to claim 1,
characterized in,
that by actuating the scroll means (6) the displayed icons successively change their position so that the enlarged display of a selected icon (A) is always located at the same position on the display means (2).

4. Terminal (1) for wireless telecommunication according to claim 3,
characterized in,
that the position of the enlarged displayed icon (A) is located on a center position of the area of the display means (2) in which the icons (A, B, C, D, E) are displayed.

5. Terminal (1) for wireless telecommunication according to claim 1,
characterized in,
that the preceding and the succeeding icon (B, E) to the actually selected icon (A) are displayed enlarged in relation to the other displayed icons (C, D) but smaller than the actually selected icon (A).

6. Terminal (1) for wireless telecommunication according to claim 1,
characterized in,
that the scroll means (6) is a jog dial which can be rotated to scroll through the icons.

7. Terminal (1) for wireless telecommunication according to claim 6,
characterized in,
that the direction of the successive enlarged display of the selected icon (A) corresponds to the rotation direction of the jog dial.

8. Terminal (1) for wireless telecommunication according to claim 1,
characterized by
a text display (F) of the menu item of the respective selected icon (A) on the display means (2) close to the position of the selected icon.

9. Method for displaying icons (A, B, C, D, E) on a display means (2) of a terminal (1) for wireless telecommunication, comprising the steps of
displaying icons (A, B, C, D, E) corresponding to menu items and other information on the display means (2),
highlighting a respective selected icon (A), which can be entered to choose the corresponding menu item,
whereby at least some of all available icons (A, B, C, D, E) of a menu are displayed on the display means (2) at the same time in a circular arrangement and
whereby the icons (A, B, C, D, E) can be scrolled through in clockwise and counter clockwise directions by actuating a scroll means (6) so that the respective selected icon (A) is highlighted depending on the actuation of the scroll means (6),
characterized in,
that the respective selectable icon (A) is displayed enlarged in relation to the other displayed icons (B, C, D, E), whereby the icons are displayed enlarged in their successive order in one of the clockwise and counter clockwise directions depending on the actuation of the scroll means (6).

10. Method for displaying icons on a display means (2) of a terminal (1) for wireless telecommunication according to claim 9,
characterized in,
that the icons (A, B, C, D, E) are displayed in a circular arrangement.

11. Method for displaying icons on a display means (2) of a terminal (1) for wireless telecommunication according to claim 9,
characterized in,
that by actuating the scroll means (6) the displayed icons successively change their position so that the enlarged display of a selected icon (A) is always located at the same position on the display means (2).

12. Method for displaying icons on a display means (2) of a terminal (1) for wireless telecommunication according to claim 11,
characterized in,
that the position of the enlarged displayed icon (A) is located on a center position of the area of the display means (2) in which the icons (A, B, C, D, E) are displayed.

13. Method for displaying icons on a display means (2) of a terminal (1) for wireless telecommunication according to claim 9,
characterized in,
that the preceding and the succeeding icon (B, E) to the actually selected icon (A) are displayed enlarged in relation to the other displayed icons (C, D) but smaller than the actually selected icon (A).

14. Method for displaying icons on a display means (2) of a terminal (1) for wireless telecommunication according to one claim 9,
characterized in,
that the scroll means (6) is a jog dial which can be rotated to scroll through the icons (A, B, C, D, E).

15. Method for displaying icons on a display means (2) of a terminal (1) for wireless telecommunication according to claim 14,
characterized in,
that the direction of the successive enlarged display of the selected icon (A) corresponds to the rotation direction of the jog dial.

16. Method for displaying icons on a display means (2) of a terminal (1) for wireless telecommunication according to claim 9,
characterized in,
that a text display (F) of the menu item of the respective selected icon (A) close to the position of the selected icon is displayed.

* * * * *